May 23, 1961 G. W. CRAWFORD 2,984,938
TREE GROWTH CORRECTING DEVICE
Filed March 13, 1959
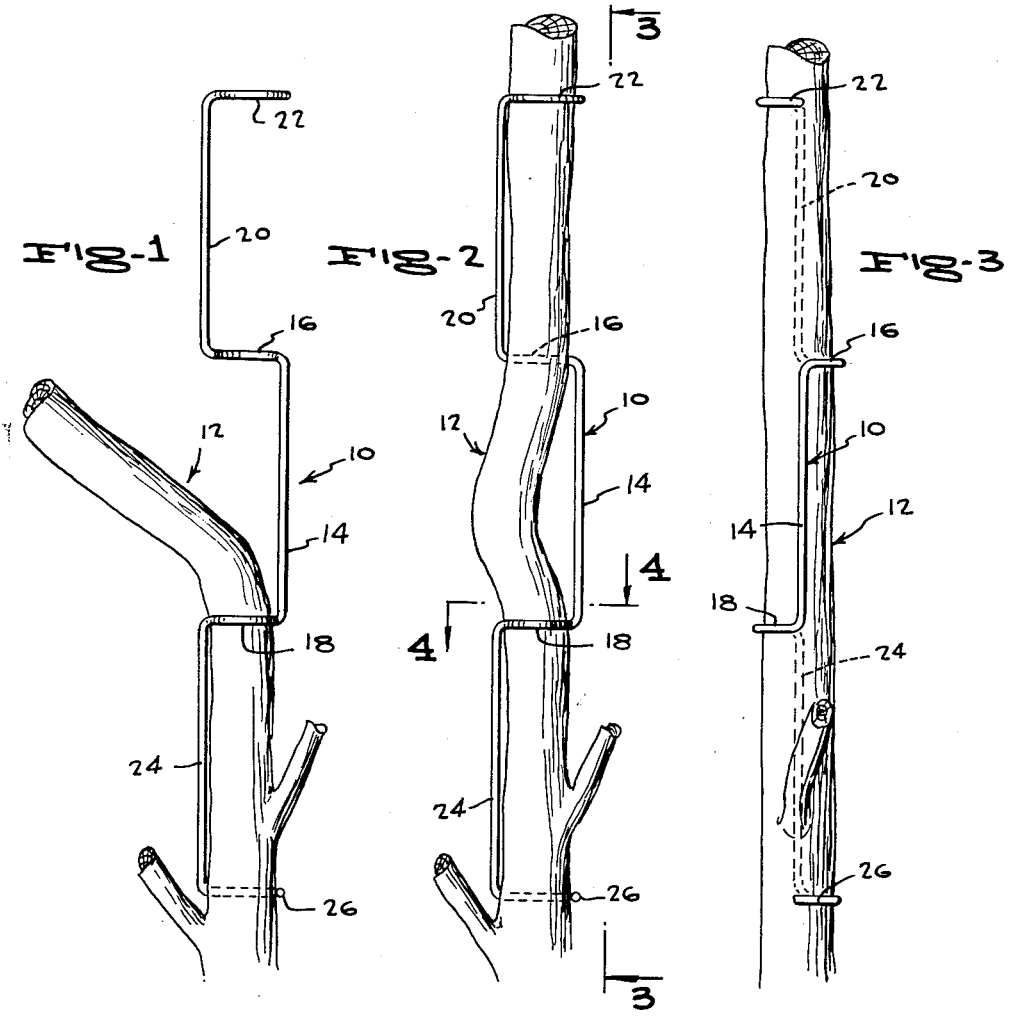
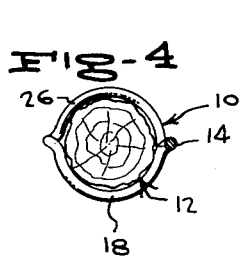
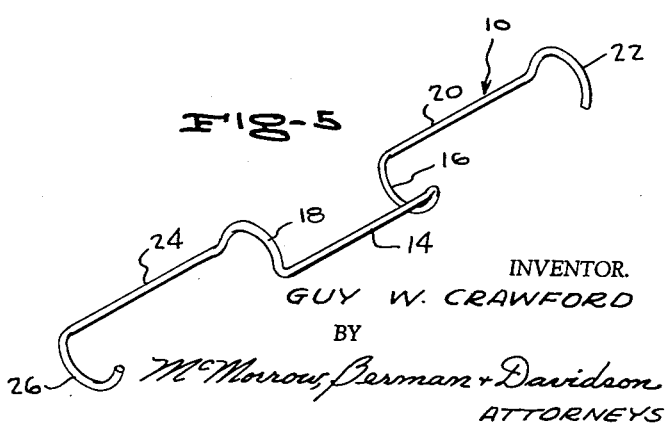
INVENTOR.
GUY W. CRAWFORD
BY
McMorrow, Berman & Davidson
ATTORNEYS

2,984,938

TREE GROWTH CORRECTING DEVICE

Guy W. Crawford, Box 124, Hesperia, Mich.

Filed Mar. 13, 1959, Ser. No. 799,230

3 Claims. (Cl. 47—42)

The present invention relates to a tree growth correcting device.

In the art of plant husbandry, it is frequently desirable to correct the growth of a tree, vine, or shrub in order to promote a particular shape in the tree, vine, or shrub. Many mechanical devices have been proposed in the past for holding a tree or shrub branch in a desired position, but generally the devices proposed have not been found efficient and acceptable throughout the industry. Reliance has been had, instead, on older and other devices such as splints, ties, and the like, the use of which is generally conceded in the industry to be time-consuming and therefore uneconomical.

An object of the present invention is to provide a tree growth correcting device which lends itself to ready and rapid application to a tree, vine, or shrub branch for correcting the growth of the same.

Another object of the present invention is to provide a tree growth correcting device which lends itself to installation on the branch of a tree, vine, or shrub with ease and facility.

A further object of the present invention is to provide a tree growth correcting device which is simple in structure, one having universal application in the plant husbandry industry, one which may be manufactured in quantity and at a reasonable cost, and one which is highly effective in action.

These and other objects and advantages of the present invention will be fully apparent from the following description when taken in conjunction with the annexed drawing, in which:

Figure 1 is an elevational view of the device of the present invention, shown partially installed upon a portion of a tree branch to be straightened;

Figure 2 is an elevational view showing the device completely installed on the branch;

Figure 3 is a view taken on the line 3—3 of Figure 2;

Figure 4 is a view taken on the line 4—4 of Figure 2; and

Figure 5 is an isometric view of the device of the present invention removed from the branch.

Referring in greater detail to the drawing in which like numerals indicate like parts throughout the several views, the tree growth corercting device of the present invention is designated generally by the reference numeral 10 and is shown, in Figures 1 to 4, in association with a portion 12 of a woody plant, the woody plant being a tree, vine, or shrub, or other natural growth.

The device 10 comprises a straight elongated shank 14 having a concavely curved member 16 projecting transversely from one end of the shank 14 and another concavely curved member 18 projecting transversely from the other end of the shank 14.

The curved members 16 and 18 are in linear alignment and face in opposite directions, relative to each other.

Anchoring means is provided on each of the members 16 and 18, the anchoring means being elongated and projecting longitudinally from each of the members 16 and 18 and being for fixedly holding the shank 14 and members 16 and 18 in position about a tree branch for growth correction. Specifically, this means embodies a straight leg 20 projecting from the end of the curved member 16 remote from the shank 14 and a hook 22 projecting transversely from the end of the leg 20 remote from the member 16. The means also includes another leg 24 projecting from the end of the curved member 18 remote from the shank 14 and another hook 26 projecting from the end of the leg 24 remote from the member 18.

The hook 26 projects transversely from the leg 24 and is in linear alignment with the hook 22. The hooks 22 and 26 face in opposite directions.

The legs 20 and 24 are also in linear alignment and when the device 10 is positioned on a tree branch, the legs 20 and 24 will be on one side of the branch 12 and opposite to the shank 14.

The hooks 22 and 26 are arcuately curved with substantially the same radius of curvature as the curved members 16 and 18.

As shown in Figure 5, the hooks 22 and 26 are in linear alignment with the curved members 16 and 18 and the hook 22 faces in the same direction as the member 18, while the hook 26 faces in the same direction as the member 16.

The device 10 is fabricated of a rigid wire piece of the desired degree of strength required for holding the branch 12 in the straightened position shown in Figures 2 and 3 after the branch 12 has been moved from its curved or bent position shown in Figure 1.

Preferably, the device 10 is of a degree of resiliency permitting the manipulation of the hooks 22 and 26 about the branch 12 after the curved members 16 and 18 have been positioned at each end of the portion of the branch 12 to be straightened.

In use, the device 10 is easily and quickly attached to a branch of a tree, vine, or shrub to be straightened, whether such branch be a lateral, or a terminal portion of such tree, vine, or shrub. By using the device 10, the horticulturist is enabled to quickly and easily train trees, shrubs, and the like in desired shapes and with efficiency and at a reasonable cost.

What is claimed is:

1. In a tree growth correcting device, a straight elongated shank, a concavely curved member projecting transversely from each end of said shank, said curved members facing in opposite directions and being in linear alignment, and an elongated anchoring means projecting longitudinally from each of said members for fixedly holding said shank and curved members in position about a tree branch for growth correction.

2. In a tree growth correcting device, a straight elongated shank, a concavely curved member projecting transversely from each end of said shank, said curved members being in linear alignment, and an anchoring means on each of said members for fixedly holding said shank and curved members in position about a tree branch for growth correction, said means embodying a straight leg and a hook projecting transversely from the end of said leg remote from the adjacent curved member, the hooks facing in opposite directions.

3. In a tree growth correcting device, a straight elongated shank, a concavely curved member projecting transversely from each end of said shank, said curved members facing in opposite directions and being in linear alignment, and an anchoring means on each of said members for fixedly holding said shank and curved members in position about a tree branch for growth correction, said means embodying a straight leg and a hook projecting transversely from the end of said leg remote from the adjacent curved member, the hooks facing in opposite directions and being in linear alignment with said curved members.

References Cited in the file of this patent

UNITED STATES PATENTS

| | | |
|---|---|---|
| 503,161 | Raby | Aug. 15, 1893 |
| 525,010 | Fuller | Aug. 28, 1894 |
| 2,006,874 | Rich | July 2, 1935 |